May 12, 1959 — K. M. OPIE — 2,886,278
WALL BRACKET
Filed Oct. 8, 1956
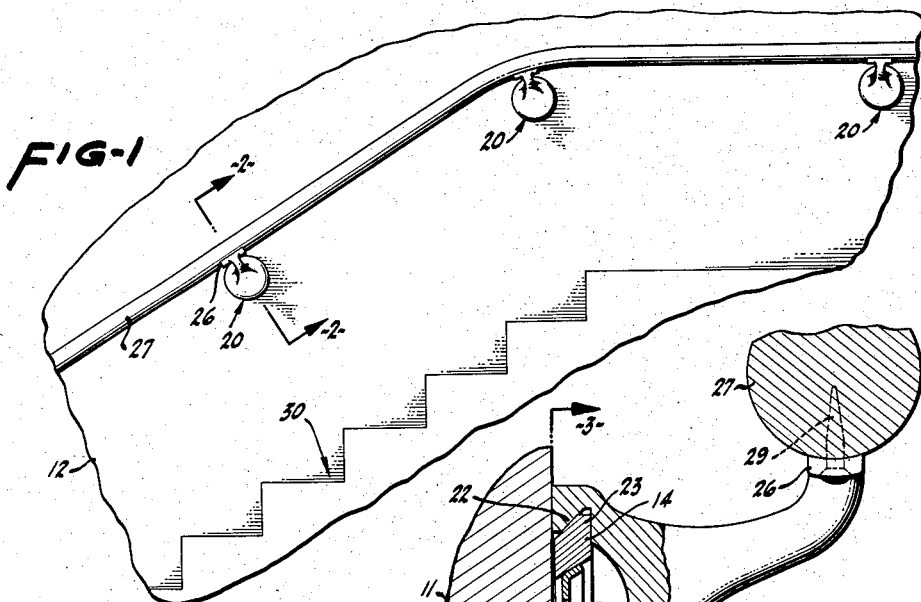
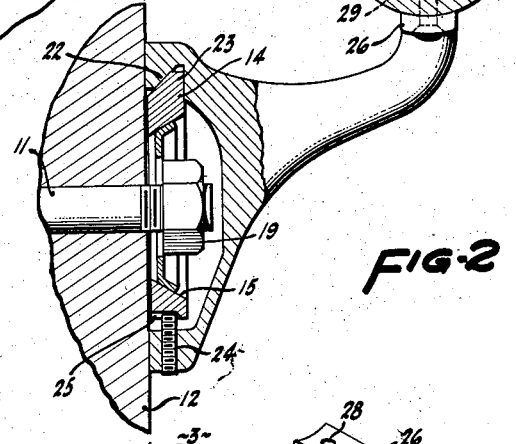
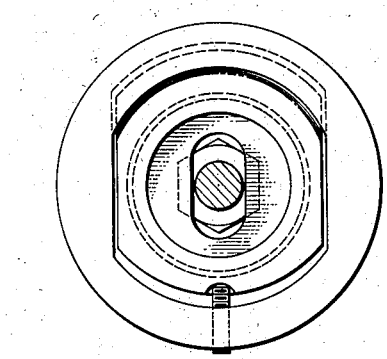
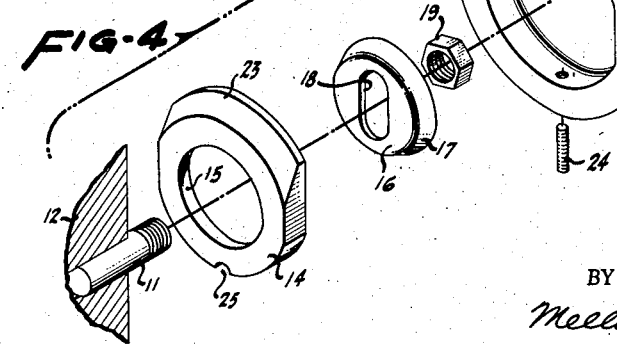
INVENTOR.
KENNETH M. OPIE
BY Mellin and Hanscom
ATTORNEYS.

United States Patent Office 2,886,278
Patented May 12, 1959

2,886,278
WALL BRACKET
Kenneth M. Opie, Burlingame, Calif.
Application October 8, 1956, Serial No. 614,497
6 Claims. (Cl. 248—274)

This invention relates to wall brackets, and particularly to an adjustable bracket for mounting hand rails.

It is among the objects of this invention to provide a bracket mounting by which a rail-supporting bracket arm may be readily adjusted to support a rail in true alignment without relocating the bracket.

It is also an object to provide a bracket support which will permit a relatively wide range of adjustment radially, in any direction, for aligning a plurality of rail supports.

A further object is to provide a bracket support in which an adjusting disc is rotatably seated upon a mounting plate to which it may be clamped in adjusted position by a nut threaded onto a stud over which the plate and disc are mounted, the plate and disc together being clamped against a supporting surface to support a bracket in accurately adjusted position thereon.

Another object is to provide an adjustable support for wall brackets of the rail-supporting type, whereby the bracket may be accurately positioned vertically, horizontally, and angularly to obtain proper alignment of the rail from end to end at any selected angle.

A further object is to provide an adjustable rail support which conceals the fastening means while permitting the accurate mounting of the support in a predetermined position upon a surface when the stud used to secure said support to the surface has been incorrectly located.

A still further object is to provide a bracket mounting by which the mounting plate and supporting stud are fully enclosed by the bracket, and which permits the bracket to be removed when the wall is to be painted or for other purposes.

Still further objects are to provide improved features of construction, assembly and appearance, affording economy and increased efficiency in manufacture and installation.

These and other objects, some of which will be hereinafter explained in greater detail, are accomplished by means of the device of the present invention, an illustrative embodiment of which is shown in the accompanying drawings forming a part of the present specification. The invention, of course, is not limited to the particular details of construction shown in the drawings, as the structure may be modified in various ways, and the invention otherwise embodied within the scope of the appended claims.

In the drawings:

Fig. 1 is a fragmental elevational view illustrating, somewhat diagrammatically, brackets embodying the invention as mounted to support a hand rail along a stairway.

Fig. 2 is a fragmental side elevational view of the bracket, partly in vertical section, the plane of the section being indicated by the line 2—2 of Fig. 1.

Fig. 3 is a view of the back of the bracket mounting, as viewed on the plane, indicated by the line 3—3 of Fig. 2.

Fig. 4 is an exploded perspective view of a bracket and mounting means made in accordance with this invention.

In terms of broad inclusion, the wall bracket of the present invention comprises a mounting plate mountable upon a stud anchored in a wall. The stud may take the form of a bolt anchored in the wall, an expansion bolt device, a pre-cast insert and bolt or screw, a toggle bolt, a lag screw, a wood screw or other conventional fastening means, and when the term "stud" is used herein, it encompasses such other fastening devices. An adjusting disc, having a diametrically disposed slot engaging the stud, is seated in an annular seat formed in the mounting plate and encircling the stud, the disc being rotatable to position the slot at a desired angle permitting radial adjustment through a substantial range in any direction. The bracket is provided with a base recessed to seat over the mounting plate and adjusting disc to completely enclose the same together with a nut threaded onto the end of the stud to clamp the disc against the plate and the plate against a wall. An inwardly disposed arcuate flange upon the bracket base is interlockingly engageable with a mating flange formed upon the mounting base in spaced relation to the adjusting disc. The bracket is interengageable with the mounting base, in any adjusted position thereof, by relative rotational movement, and is secured in a desired position by suitable securing means, such as a set screw.

In terms of greater detail, the device of the present invention comprises a stud 11 anchored in a wall 12 with a threaded end extending outwardly from the wall at right angles thereto. A mounting plate 14 is mounted over the stud 11, and is provided with an annular seat 15, preferably of conic shape, encircling the stud.

An adjusting disc 16 is formed with a peripheral edge 17 shaped to conform to the seat 15. A slot 18 is formed in the disc 16, in diametrical position, to engage the stud 11. The slot 18 is of a length sufficient to permit substantial adjustment of the plate and disc radially relative to the stud. A nut 19 is threaded onto the outer end of the stud. The nut is arranged to be tightened against the adjusting disc to secure it in seated position upon the plate 14 and to secure the plate against the wall, as best shown in Fig. 2 of the drawings.

A bracket, designated in general by the numeral 20, is provided with a base 21 recessed to seat over the mounting plate and to enclose the outer end of the stud 11 and nut 19. The bracket is provided with an inwardly extending arcuate flange portion 22 interlockingly engageable with a matching arcuate extension 23, which extends outwardly from the mounting plate 15 in radially spaced relation to the adjusting disc 16. Preferably, the inner face of the flange portion 22 and the back of the arcuate extension 23 are of matching conic form and interengageable to permit rotation of the bracket relative to the adjusting disc, and to provide a mutual wedging action for securely locking the bracket in adjusted position upon the mounting plate, adjusting disc and wall. A set screw 24 threaded through the base portion 21 of the bracket engages a notch 25 in the mounting plate for securing the bracket in interlocked engagement with the mounting plate.

As illustrated, the bracket 20 is provided with a rail rest 26 forming a seat for a hand rail 27. Openings 28 are formed in the rest 26 to receive screws 29 by which the rail may be secured to the bracket. The bracket, of course, may be utilized as a support for any other object or mechanism requiring accurate alignment between a number of different points of support.

In its illustrated application, as a support for a hand rail, studs 11 are set in the wall at desired points spaced in approximate alignment above a stairway 30. Approximate positioning of the studs may be readily accomplished in either new or old constructions, but accurate alignment is difficult in either case. A hand rail is unsightly unless supported in accurate alignment along its full length, and the support must be rugged enough to support a heavy load. The present device is designed to accomplish both purposes.

The studs 11 are anchored in the wall in approximate alignment, allowance being made where necessary to avoid reinforcing bars or the like, or to secure solid anchorage in wooden frame structures. With the studs in place, the mounting plates 14 and adjusting discs are applied thereover, and are manipulated to position the mounting plates with the top points of the extensions 23 tangent to a line parallel to the axis of the rail. By rotating the adjusting discs to appropriate angles, the assembly can be shifted vertically, horizontally, and angularly to desired position, with the rest 26 of each bracket disposed at proper angle to support the rail 27, as shown in Fig. 1 of the drawings.

Final adjustment of the mounting members may be accomplished, as the rail is installed, by tightening the nut 19 only sufficiently to hold the parts against slippage, while permitting shifting to final adjusted position. The brackets may then be lifted from the mounting plates and the nuts 19 tightened to securely hold the parts in place. The set screw 24, when tightened, engages in the notch 25 locking the bracket in fixed position.

The set screws 24 permit the brackets 20 to be removed for any purpose and especially when the wall is to be painted, so that the brackets may be kept free of paint. The back of the base covers any minor damage to the wall which may occur during the setting of the studs or the adjustment of the bracket support.

Having thus described my invention, what I claim and desire to secure by Letters Patent is:

1. A wall bracket comprising a stud adapted to be anchored in outwardly extending position upon a wall, a mounting plate seatable against the wall over the stud, said plate having an annular seat encircling the stud and an upper load-bearing portion, an adjusting disc rotatably engageable with the seat and having a slot engageable with the stud and permitting radial adjustment of the plate and disc in any direction relative to the stud, means for securing the plate and disc in relatively adjusted relation in seated position against the wall, a bracket provided with a base having an upper portion recessed for seating over the mounting plate, interlockingly engageable shoulder means upon the upper portions of said base and mounting plate, and means for securing the bracket in engagement with the base.

2. A wall bracket as defined by claim 1, wherein the annular seat of the mounting plate is of outwardly faced conic form and the annular disc is provided with a peripheral edge of corresponding conic form rotatably engageable with the seat, and wherein the slot is positioned diametrically with respect to the disc and is of a length permitting substantial movement of the plate and disc radially in any direction around the stud.

3. A wall bracket as defined by claim 2 wherein the plate and disc are arranged to be secured in relatively adjusted relation with the plate in desired position against the wall by a nut threaded onto the outer end of the stud.

4. A wall bracket as defined by claim 1 wherein the mounting plate is provided with an arcuate bracket-engaging seat radially spaced from the adjusting disc, and wherein the bracket base is provided with an inwardly extending seat-engaging flange interlockingly engageable with the bracket-engaging seat by relative rotational movement.

5. A wall bracket as defined by claim 4 wherein the bracket-engaging seat of the mounting plate is of conic form substantially concentric with the adjusting disc along the length of its arc, and the bracket base flange is of corresponding conic form rotationally movable for engagement between the seat and the wall.

6. A wall bracket comprising a stud, a mounting plate having an axis and an annular conic seat encircling the stud, an adjusting plate having a peripheral edge of matching conic form rotatably engaging the seat, said plate having a diametrically disposed slot engaging the stud and being radially shiftable thereon, a nut threaded onto the outer end of the stud movable to clamp the disc in adjusted position relative to the mounting plate and to clamp said plate against a wall, a bracket having a base recessed to seat over the mounting plate and to enclose the stud and adjusting disc, means restraining said bracket and mounting plate against relative rotation about said axis, an inwardly disposed interlocking flange upon the base, and an outwardly extending flange upon the mounting plate interengageable with the flange of the base for supporting the bracket in angularly adjusted position upon the mounting plate.

References Cited in the file of this patent

UNITED STATES PATENTS

| | | |
|---|---|---|
| 659,068 | Ives | Oct. 2, 1900 |
| 818,700 | Morewood | Apr. 24, 1906 |
| 1,031,368 | Perry | July 2, 1912 |
| 1,810,229 | Stirrup | June 16, 1931 |
| 1,915,479 | Smith | June 27, 1933 |
| 1,940,888 | Smith | Dec. 26, 1933 |